Nov. 20, 1945.  E. M. HULQUIST  2,389,574
UTILITY CART
Filed Sept. 30, 1944
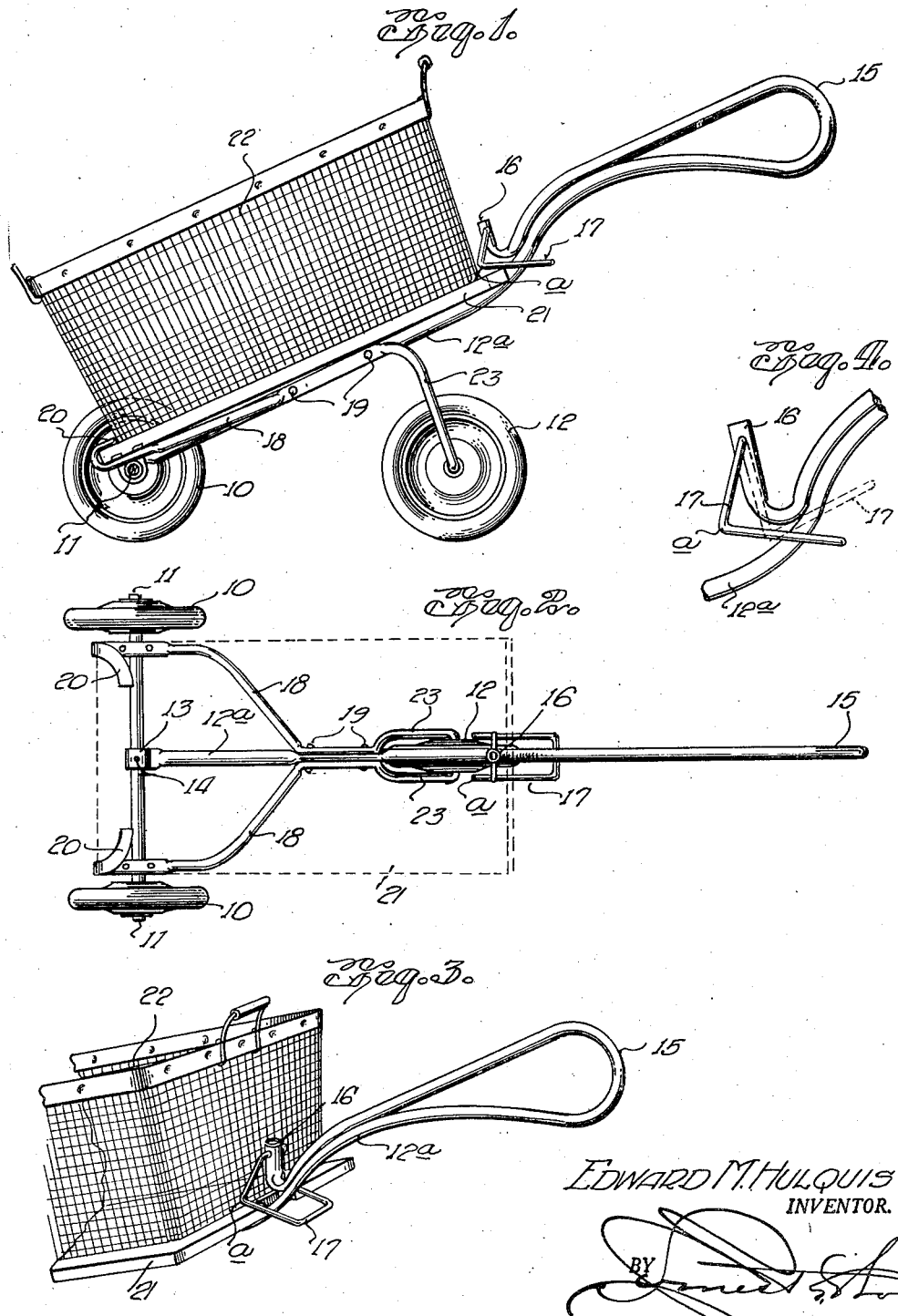
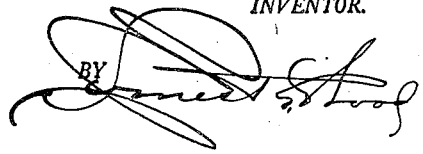
EDWARD M. HULQUIST
INVENTOR.

Patented Nov. 20, 1945

2,389,574

UNITED STATES PATENT OFFICE 2,389,574

UTILITY CART

Edward M. Hulquist, Dallas, Tex., assignor to Dean Field, Dallas, Tex.

Application September 30, 1944, Serial No. 556,553

4 Claims. (Cl. 280—50)

This invention relates to wheeled vehicles and it has particular reference to a utility cart or package carrier.

The principal objects of the invention are two-fold; to provide a parcel basket or container designed to be especially accommodated by and transportable on the cart, and a cart having new features of construction, equipped with a novel form of gravity latch for holding the basket against displacement from the cart.

In shopping, especially for groceries and other commodities for home consumption, both the merchant and customer are almost always discommoded, the latter by lack of a suitable conveyance or container in which to deposit articles as they are selected by the customer, as in a self serving establishment. The merchant is put to trouble and expense in having to supply the conveyance for articles within the store as well as sacks or boxes in which the customer transports the articles from the store to the home.

It is therefore the chief object of the present invention to provide an inexpensive conveyance, which by virtue of its three wheels, is self supporting and while the attendant parcel containing basket is especially designed to be mounted upon and transported by the cart, the latter may serve other utilitarian purposes by removing the basket.

With the foregoing objects as paramount, the invention has further reference to certain features of accomplishment which will become apparent as the description proceeds, taken in connection with the accompanying drawing wherein:

Figure 1 is a side elevational view of a utility cart constructed according to the present invention.

Figure 2 is a plan view of the cart with the basket removed, but whose relationship is shown in broken lines.

Figure 3 is a fragmentary rear perspective view to better illustrate the basket latch, and Figure 4 is a fragmentary detail view of the latch.

Continuing with a more detailed description of the drawing, reference numeral 10 denotes the two front wheels, mounted upon an axle 11. The third or supporting wheel 12, while shown as being suspended by a rigid frame, it may be made to swivel, if desired, with but little structural variation.

The frame may be constructed of flat or tubular stock but the latter is shown in the drawing. A central member 12a is curved at one end at 13 to conform to the curve of the axle and is secured thereto by a bolt or pin 14. The member extends rearwardly and is bent upon itself to define a loop 15, serving as a handle for the cart. The returning end of member 12a is curved downwardly, thence upwardly, terminating in a projection 16, providing a hanger for a gravity latch 17, to which more specific reference will be made presently.

A pair of braces 18 are provided, one on each side of the member 12a. These braces may be constructed from the same but smaller stock as the member 12a, in the present case, tubular material. They are flattened intermediate their ends to lie flush against a flattened section of the member 12a and to which they are bolted or riveted at 19. Their forward ends are flattened and lie transversely across the axle 11 adjacent the wheels and are bent upwardly and inwardly so that their ends 20 will be confronting. Thus, receptacles are formed for the forward end of a base 21 of a basket 22.

The braces 18 may obviously be constructed of a single piece of stock, in which case the rearmost portion is bent downwardly to define a hanger 23 for the supporting wheel 12, which revolves on an axle formed by a right angular bend in the rear extremity of the brace member.

Returning to the gravity latch 17, previously referred to, it will be noted that this element consists of a flattened loop of wire pivotally suspended at one end from the projection 16 of the member 12a and bent outwardly intermediate its ends at a to overbalance the same, constraining the bend a to lie forwardly of a vertical line through the pivotal point. In this manner, the said bend a will normally overlie the edge of the base 21 of the basket 22 to hold the same down against the frame of the cart and prevents forward tilting thereof. To effect release of the latch, it is simply necessary to lift the tail portion thereof upwardly, which action moves the bend a from its position over the base 21, allowing the latter to be slid rearwardly a distance sufficient to withdraw the opposite end thereof from the curved forward ends 20 of the brace members 18. Being thus released, the basket may be removed from the cart to be borne by a shopper as purchases are selected and placed therein. After settlement is made for the purchases, the basket is returned to the cart and the latter is wheeled from the store.

It is obvious from the foregoing that the cart may serve other utilitarian purposes by removing the basket 22 and although the base 21 thereof is shown as being attached to the basket, a platform of similar dimensions may be constructed and used as a support for any burden which it may be desired to transport on the cart. The manner of securing the substitute base may be the same as described for that of the basket, i. e., the latch 17.

Manifestly, the construction and process as shown and described is capable of some modification and such modification as may be construed to fall within the scope and meaning of the appended claims is also considered to be within the spirit and intent of the invention.

What is claimed is:

1. A utility cart including a frame comprising an axle having wheels thereon, a central member connected at one end to said axle intermediate its ends and extending rearwardly and bent upon itself to define a loop handle and terminating in an upright projection at a point spaced forwardly of said handle, brace members supporting a third wheel below said central member and rearwardly of said first wheels and having hooked forward ends affixed to said axle on each side of said central member, a parcel container having a base retained at one end by the hooked ends of said braces and a pivoted, gravity controlled latch suspended from said upright projection to overlie the opposite end of said container base to retain the same on said cart.

2. A utility cart including a frame comprising a central member supporting a wheeled axle at one end and having a loop handle at the other, side braces supporting a third wheel rearwardly of said axle and having upwardly and rearwardly turned ends affixed to said axle, a parcel container having a base supported on said central member and braces, whose forward end is retained by the ends of said braces and gravity controlled means for securing the rear end of said base to said frame.

3. A utility cart including a frame comprised of a central member having a wheeled axle and a pair of side braces supporting a third wheel and having their forward ends turned upwardly, a load carrying body demountably supported on said frame whose forward end is retained by the ends of said braces, and a swinging latch mounted on said central member to normally overlie and hold the opposite end of said body on said frame.

4. A parcel transporting cart including a frame having two wheels at its forward end and a third wheel spaced rearwardly therefrom, a parcel supporting member carried by said frame, means arranged on said frame to overlie and hold the forward portion of said member, a latch pivoted on said frame adapted to overlie and hold the rear portion of said member, consisting of a flattened loop pivotally suspended at one end and bent intermediate its ends at substantially right angles to define a tail portion overbalancing the remaining portion of the latch and constraining said portion to lie normally in a plane inclined to the vertical and arranged for forward swinging movement to release said member for displacement of the latter.

EDWARD M. HULQUIST.